(No Model.)
A. LINDGREN.
DRAFT EQUALIZER.
No. 376,533. Patented Jan. 17, 1888.
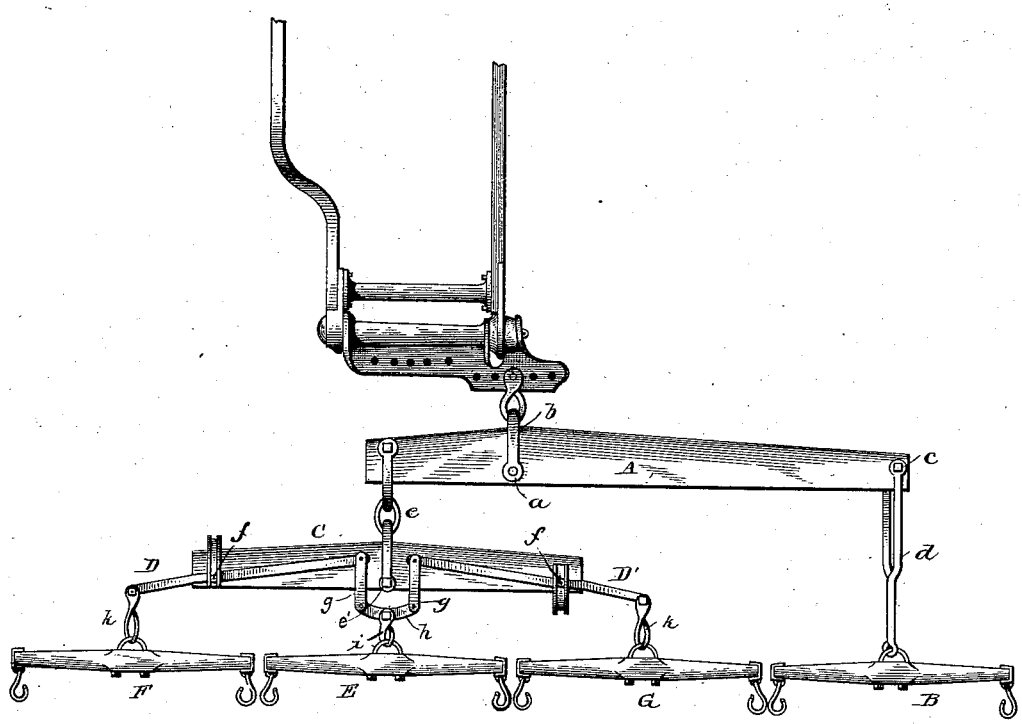
WITNESSES
Edwin L. Yewell
F. T. Chapman.
INVENTOR
August Lindgren
By Phil T. Dodge
Attorney

UNITED STATES PATENT OFFICE.

AUGUST LINDGREN, OF MOLINE, ILLINOIS, ASSIGNOR TO THE MOLINE PLOW COMPANY, OF SAME PLACE.

DRAFT-EQUALIZER.

SPECIFICATION forming part of Letters Patent No. 376,533, dated January 17, 1888.

Application filed October 14, 1887. Serial No. 252,320. (No model.)

*To all whom it may concern:*

Be it known that I, AUGUST LINDGREN, of Moline, in the county of Rock Island and State of Illinois, have invented certain Improvements in Draft-Equalizers, of which the following is a specification.

Draft eveners or equalizers have heretofore been made in a great variety of forms for the purpose of connecting a number of draft-animals with a vehicle or implement.

My invention relates to an equalizer for use in connection with four animals traveling abreast, and is more particularly designed for connecting the team with a wheeled plow in such manner that three of the horses may travel on the unplowed land and the fourth travel in the furrow.

In the accompanying drawing the figure represents a top plan view of my contrivance.

Referring to the drawing, A represents a horizontal lever working on a fulcrum, $a$, which will be provided with a clevis, $b$, or other means of attachment to the implement. The long arm of the lever is connected at its extremity by a vertical pivot, $c$, to a link or arm, $d$, which is extended forward and connected at its front end to a singletree, B, to which one of the draft-animals is attached. The shorter arm of the lever A is connected at its extremity by a clevis, $e$, or equivalent coupling to the vertical pivot $e'$ of a doubletree, C, the pivot being located at the middle. To the opposite extremities of the doubletree I connect by vertical pivots $f$ two horizontal levers, D D', having their pivots located one-third of their length from the outer end. The inner ends of the levers D D' are connected by links $g$, or otherwise, to opposite ends of a bar, $h$, which is in turn connected at its middle by a coupling, $i$, to a singletree, E. The levers D and D' are connected, respectively, at their outer end by couplings $k$ to singletrees F and G.

The distance between the fulcrum of the lever A and its outer connection, $c$, is three times the distance between the fulcrum and the inner connection, $e$. Under the above arrangement it will be perceived that the four singletrees may be arranged in line, and that the strain applied by the team to the implement will be evenly apportioned between the four animals.

Having thus described my invention, what I claim is—

The four-horse equalizer consisting of the lever A, fulcrumed nearer one end than the other, the singletree B, attached to the longer end of lever A, the doubletree C, attached to the shorter end of said lever, the levers D and D', mounted at opposite ends of the doubletree, the singletrees F and G, attached to the outer ends of the levers D and D', respectively, and the intermediate singletree, E, connected to the inner and longer ends of the levers D and D'.

In testimony whereof I hereunto set my hand, this 12th day of September, 1887, in the presence of two attesting witnesses.

AUGUST LINDGREN.

Witnesses:
A. L. CARSON,
A. A. CRAMPTON.